United States Patent [19]

Hurtgen

[11] Patent Number: 4,880,391

[45] Date of Patent: Nov. 14, 1989

[54] APPARATUS FOR CONNECTING MULTIPLE WINDINGS

[75] Inventor: Jerome P. Hurtgen, Fort Wayne, Ind.

[73] Assignee: General Electric Company, Fort Wayne, Ind.

[21] Appl. No.: 213,720

[22] Filed: Jun. 30, 1988

[51] Int. Cl.$^4$ .............................................. H01R 29/00
[52] U.S. Cl. ...................................... 439/221; 310/71; 318/770; 439/814
[58] Field of Search .................... 439/166–175, 439/217–224, 814; 310/71, 89, 181, 184; 318/770, 771, 441, 442

[56] References Cited

U.S. PATENT DOCUMENTS

| | | | |
|---|---|---|---|
| 1,754,645 | 4/1930 | Oswald | 310/71 |
| 1,971,803 | 8/1934 | Zetsche et al. | 439/89 |
| 2,024,726 | 12/1935 | Ehrenfeld | 318/770 |
| 2,094,386 | 9/1937 | Veinott | 310/71 |
| 2,174,652 | 10/1939 | Casner | 310/71 |
| 2,321,999 | 6/1943 | Dalton | 439/43 |
| 2,399,753 | 5/1946 | McLarn | 219/4 |
| 2,466,900 | 4/1949 | Knopp | 318/770 |
| 2,507,242 | 5/1950 | Bost | 439/49 |
| 2,543,131 | 2/1951 | Seifried | 318/770 |
| 2,552,028 | 5/1951 | Blair | 439/722 |
| 2,619,621 | 11/1952 | Brown | 318/753 |
| 2,652,506 | 9/1953 | Furnas et al. | 310/71 |
| 2,702,362 | 2/1955 | Falck | 318/770 |
| 2,722,645 | 11/1955 | Brown | 318/770 |
| 2,727,215 | 12/1955 | Brown | 439/53 |
| 2,785,324 | 3/1957 | Manney et al. | 310/71 |
| 2,922,054 | 1/1960 | Miller | 439/221 |
| 2,962,693 | 11/1960 | Ott | 439/849 |
| 3,054,078 | 9/1962 | Bashkin | 439/44 |
| 3,139,492 | 6/1964 | Cage, Jr. | 439/172 |
| 3,210,578 | 10/1965 | Sherer | 439/221 |
| 3,231,767 | 1/1966 | Powell | 310/71 |
| 3,233,129 | 2/1966 | Schaefer | 439/221 |
| 3,439,244 | 4/1969 | Donahoo | 318/770 |
| 3,440,592 | 4/1969 | Zelle | 439/108 |
| 3,453,403 | 7/1969 | Hoffman | 439/221 |
| 3,488,569 | 6/1970 | Allendorph et al. | 318/770 |
| 3,518,522 | 6/1970 | Jaffe et al. | 318/349 |
| 3,525,912 | 8/1970 | Wallin | 318/17 |
| 3,541,365 | 11/1970 | Willits et al. | 310/71 |
| 3,581,268 | 5/1971 | Akst | 439/507 |
| 3,586,940 | 6/1971 | Benirschke | 318/770 |
| 3,602,748 | 8/1971 | Locke | 439/172 |
| 3,659,188 | 4/1972 | Alexander et al. | 322/28 |
| 3,707,637 | 12/1972 | Charlton et al. | 310/71 |
| 3,715,707 | 2/1973 | Anderson | 439/721 |
| 3,771,102 | 11/1973 | Murray et al. | 439/189 |
| 3,878,318 | 4/1975 | Ziegler, Jr. et al. | 174/94 |
| 3,955,044 | 5/1976 | Hoffman et al. | 174/84 |
| 3,983,428 | 9/1976 | Bitsch et al. | 310/71 |
| 4,030,793 | 6/1977 | Hanlon et al. | 439/189 |
| 4,101,192 | 7/1978 | Bauerle et al. | 439/682 |
| 4,211,962 | 7/1980 | Grunleitner et al. | 318/254 |
| 4,272,689 | 6/1981 | Crosby et al. | 307/147 |
| 4,335,929 | 6/1982 | Abernathy | 439/358 |
| 4,386,333 | 5/1983 | Dillan | 439/218 |
| 4,390,219 | 6/1983 | Beehler | 439/92 |
| 4,405,190 | 9/1983 | Schroeder | 439/217 |
| 4,429,243 | 1/1984 | Crow | 310/71 |
| 4,429,935 | 2/1984 | Lamb et al. | 439/516 |
| 4,547,689 | 10/1985 | Tsuchimoto et al. | 310/71 |
| 4,585,964 | 4/1986 | Hildebrandt | 310/71 |
| 4,601,530 | 7/1986 | Coldren et al. | 439/460 |
| 4,748,355 | 5/1988 | Anderson et al. | 439/516 |

Primary Examiner—Neil Abrams
Attorney, Agent, or Firm—Ralph E. Krisher, Jr.

[57] ABSTRACT

A terminal box assembly for use in a dynamoelectric machine adapted to be energized from an electrical power source and including a plurality of windings and each winding terminating in a corresponding lead wire. The lead wires are connectable to each other and to an electrical power source in at least two different configurations for operating the motor from two different voltages. The terminal box assembly includes a plurality of terminations for connection to each of the lead wires and a terminal block having a plurality of apertures for receiving the terminations. A plug device is provided for coupling with the terminal block in at least two different orientations for interconnecting the lead wires of the motor windings. A base member is releasably coupled to the terminal block and includes a latch integral with the base for releasably coupling the terminal block and base member to the dynamoelectric machine. The terminal block also includes apparatus for connecting the electric power source to at least some of the terminations for energizing the windings of the dynamoelectric machine.

6 Claims, 7 Drawing Sheets

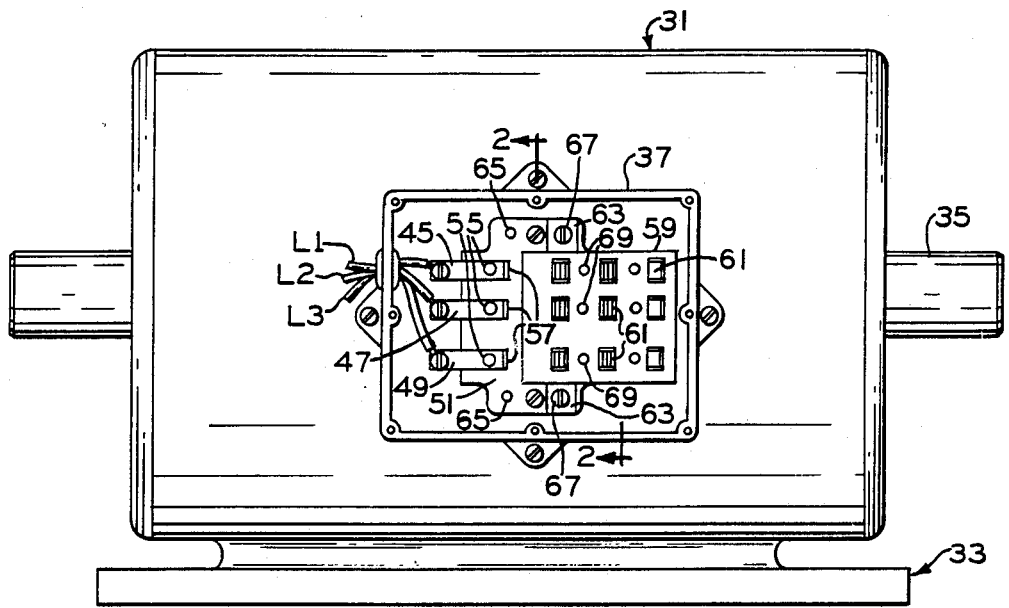
FIG. 1 (PRIOR ART)
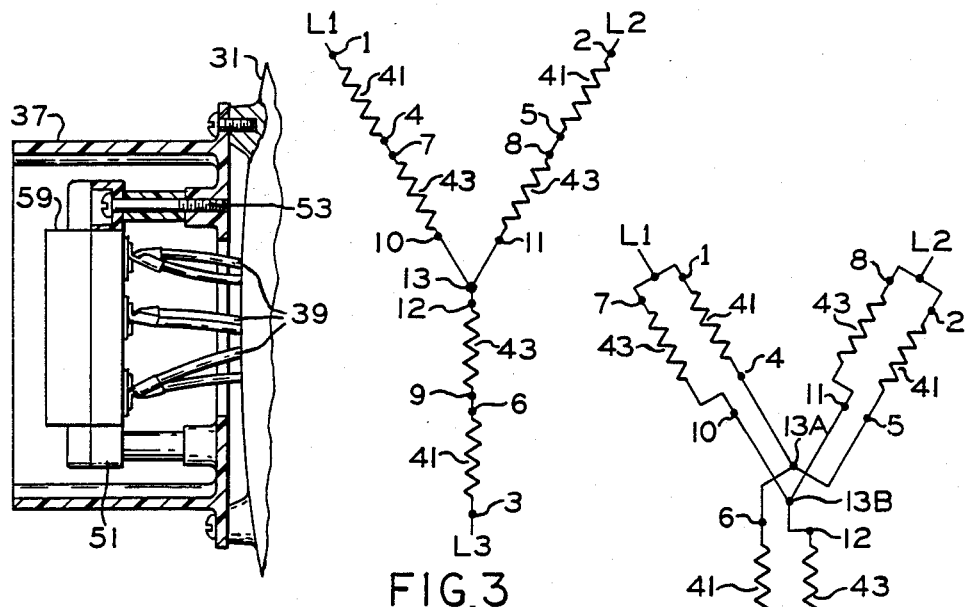
FIG. 2 (PRIOR ART)
FIG. 3
FIG. 4

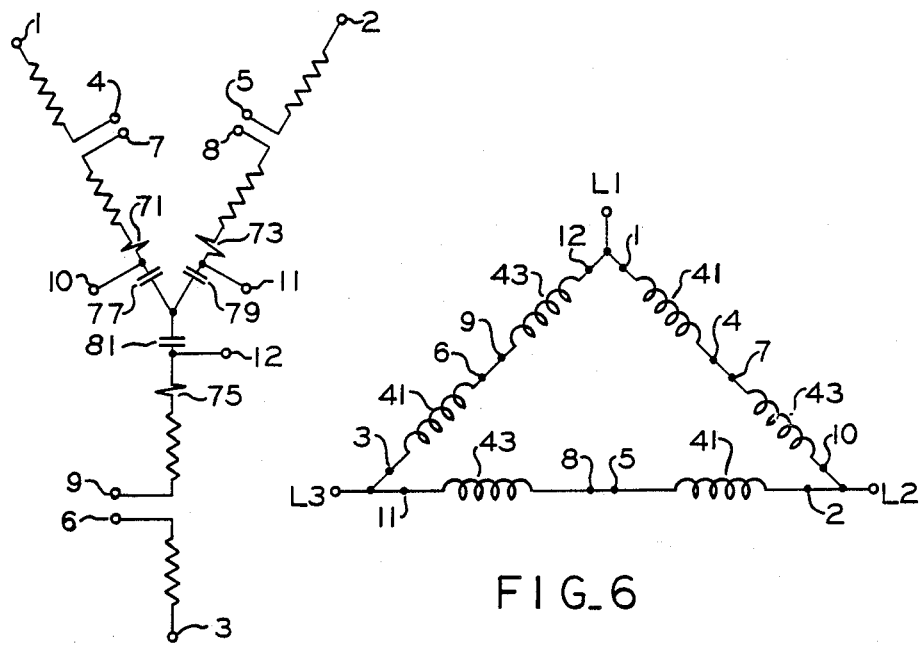
FIG_5
FIG_6
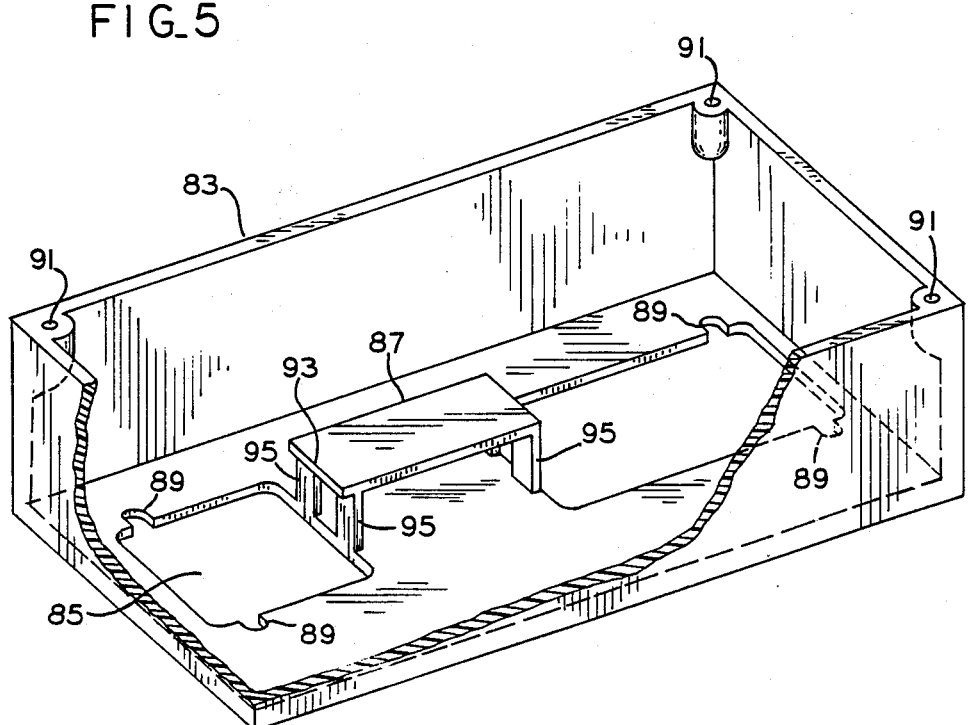
FIG_7

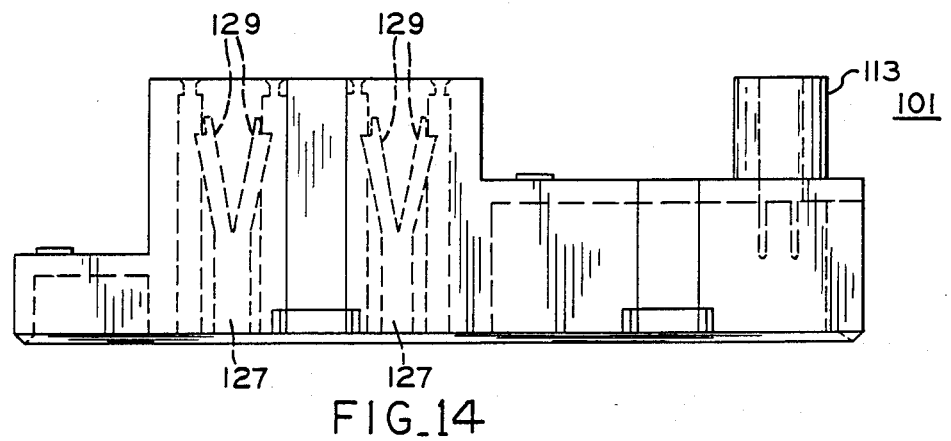
FIG_14
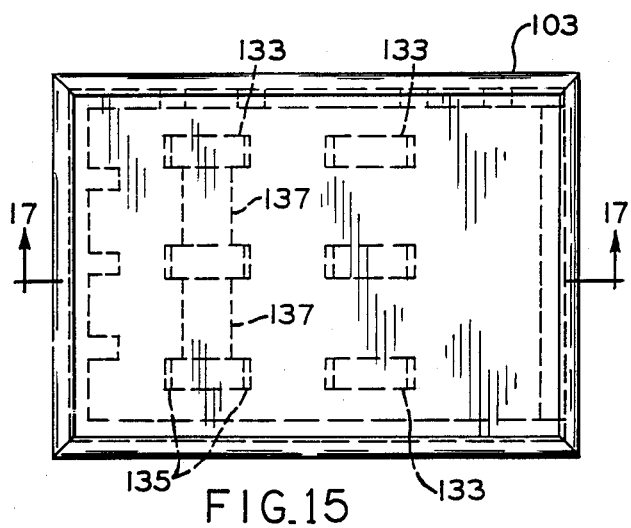
FIG_15
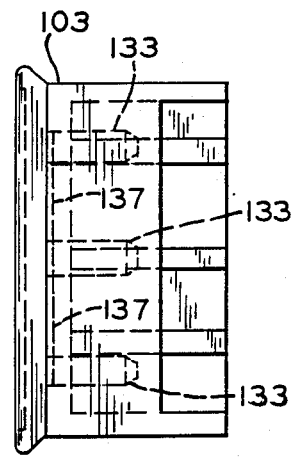
FIG_16
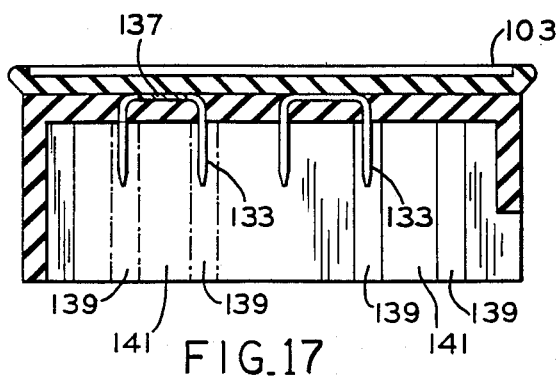
FIG_17

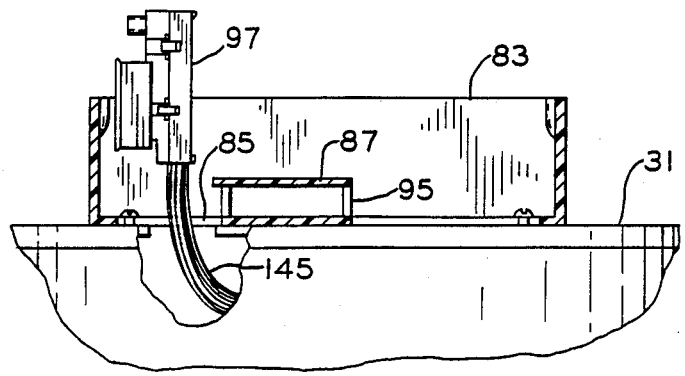
FIG.18
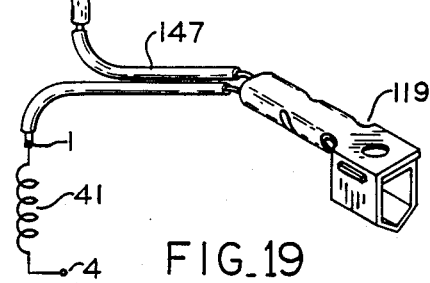
FIG.19
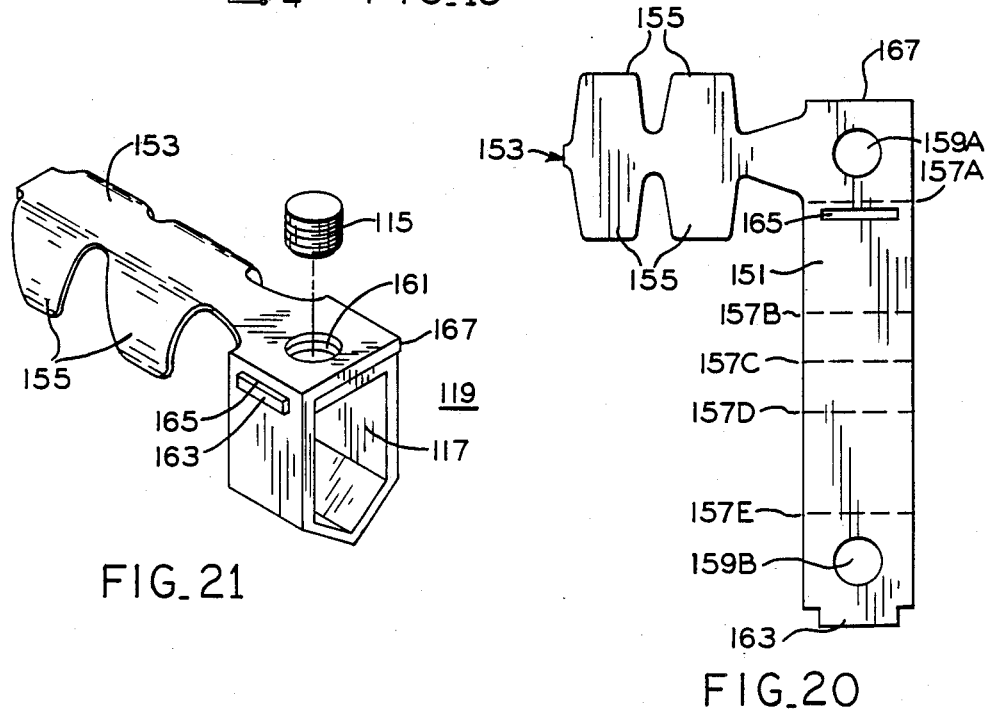
FIG.21
FIG.20

APPARATUS FOR CONNECTING MULTIPLE WINDINGS

This invention relates to dynamoelectric machines and, more particularly, to a method and apparatus for selectively connecting multiple windings of such machines into at least two different electrical configurations.

Dynamoelectric machines, such as, for example, three phase motors, are generally manufactured, in some sizes, with each phase winding of the motor stator divided into two equal size coils. The ends of each of these coils are brought out to a junction box where they are accessible for connection. Since such a motor has three phase windings, and each winding is divided into two coils, there are twelve leads brought to the junction box. The twelve leads may be connected in several different combinations in order to electrically configure the motor both into a selected type and for operation at a predetermined terminal voltage. For example, if the coils of each the windings are connected in an electrical series circuit, the motor can be operated at twice the terminal voltage, e.g., 440 volts, as would be possible if the coils of each of the windings are connected in an electrically parallel configuration. Furthermore, by appropriate connection of the coil leads, the motor windings can be electrically connected into a Wye or a delta configuration.

Because there are so many different combinations of connections of the twelve lead wires and because an error in connecting even one of the lead wires could result in destruction of the dynamoelectric machine, various types of connector blocks have been devised for terminating the coil lead wires in preselected orientations. Some of these connector blocks utilize bulky, complicated tap-changing rotary switches which, in addition to the disadvantage of large size, are generally expensive. Other forms of connector blocks have been developed in which the coil lead wires are soldered or otherwise substantially permanently attached to a base plate and a plug having preselected jumpered terminals adapted to mate with the base plate effects the interconnection of the lead wires. A disadvantage of the prior connector blocks has been the manner in which the lead wires are connected. In particular, connections of which this inventor is aware require excess lead wire length. Furthermore, replacement of a damaged terminal in such systems may require replacement of the entire base plate. Thus, it is desirable to have a dynamoelectric machine with a connector block requiring short lead wires and having replaceable terminals which can be connected directly to magnet wire leads. It would also be desirable to have a connector block which is small, compact and easily installable and includes line terminal connection means and is adaptable to the many circuits used in dynamoelectric machines.

SUMMARY OF THE INVENTION

Among the several objects and features of this invention may be noted the provision of an improved terminal box assembly for a dynamoelectric machine; the provision of a terminal box assembly which is connectable to lead wires of the dynamoelectric machine and requires relatively short lead wire lengths; the provision of a terminal box assembly which is readily assembled in situ upon connection of lead wires. These as well as other objects and advantages of this invention will become apparent from the description to follow.

In general, the invention is disclosed in a dynamoelectric machine adapted for energization from a power source and including a housing and a stationary assembly having a plurality of winding means for excitation upon the energization of the dynamoelectric machine, the winding means being disposed in a predetermined relationship with each other and winding means having a plurality of lead wires connectable to each other and the power source in at least two different configurations. A terminal box assembly is mounted to the housing exteriorly thereof and has a mounting table disposed therein. Each lead wire is connected to a termination means. A terminal block has a plurality of predeterminately oriented apertures for respectively receiving corresponding ones of said termination means connected to said lead wires. A plug device is provided for coupling with the terminal block in at least two different orientations to effect interconnection of the winding means in the at least two different configurations. A base member is releasably connected to the terminal block and seated in engagement on the mounting table within said terminal box assembly. The base member includes latching means integral with the base member for releasably maintaining the base member against displacement from the seating engagement with the mounting table. There is further provided means associated with the terminal block for connecting at least some of the termination means to the power source thereby to effect the energization of the dynamoelectric machine and the excitation of the winding means in a preselected one of the two different configurations.

In one form of the invention, the means for connecting electrical power source comprises a plurality of electrical terminals each having a first end with integral bendable tabs for crimping onto preselected ones of the lead wires. A second end of the electrical terminals is formed in a closed loop for receiving a conductor from the electrical power source. Each of the closed ends of the electrical terminals includes a threaded aperture and a screw threadedly engaged therein. The screw is positioned for clamping the conductor within the closed loop. In still another form, the second end of the electrical terminals comprises a metallic strip having a first end integral with the second end and extending from the second end perpendicular to an axis of the closed loop. A second end of the strip terminates in a reduced width tang, an aperture is formed in the strip adjacent the first end thereof and the strip is repetitively bent to form the closed loop such that the tang extends through the aperture. The second end of the electrical terminal may overlap the second end of the strip and the closed loop is formed such that the threaded aperture extends through the overlapping second ends. Still further, it is desirable in one form to provide the second end of the electrical terminal extending beyond the perimeter of the closed loop in a direction opposite the direction of the tang. The terminal block includes a plurality of slots with each slot being adapted to receive one of the electrical terminals. The tang and the extended second end of the terminal frictionally engage sides of the slot for inhibiting removal of the terminals during assembly.

The invention also involves a terminal box assembly for use in a dynamoelectric machine adapted to be energized from an electrical power source, the dynamoelectric machine including a plurality of windings disposed in predetermined relationship with each other, each winding terminating in a plurality of lead wires and the lead wires being connectable to each other and to the electrical power source in at least two different configurations. In this embodiment, the terminal box assembly comprises a plurality of termination means for connecting to corresponding ones of the lead wires. A terminal block has a plurality of predeterminately oriented aperture means for respectively receiving the termination means. The aperture means includes a plurality of means for engaging said termination means and preventing inadvertent removal thereof from the terminal block member. At least one plug device for coupling with the terminal block in at least two different orientations is also provided and includes a plurality of electrically conductive elements disposed therein. Different plug devices may be provided for different selected modes of connection of the machine. The plug devices include polarization means for improper plug usage. Each of the elements terminates in a plug means for electrically mating with a selected one of the termination means in the terminal block when the plug device is coupled to the terminal block. The elements interconnect predetermined ones of the plug means to effect connection of the windings to each other and each of the two different configurations when the plug device is coupled to the terminal block in a corresponding one of the two different orientations. A base member is releasably connected to the terminal block and latching means integral with the base member releasably couples the connected terminal block and base member to the dynamoelectric machine. There is further provided means associated with the terminal block connecting the electrical source to the at least some termination means for energizing the windings of the dynamoelectric machine in a preselected one of the two different configurations. The arrangement is selected to minimize lead length to conserve material and to facilitate the use of coil end winding wires as leads.

BRIEF DESCRIPTION OF THE DRAWINGS

FIG. 1 illustrates a dynamoelectric machine with an open external conduit box incorporating a prior art interconnection device;

FIG. 2 is a partial cross-sectional view taken along the lines 2—2 of FIG. 1;

FIGS. 3–6 are diagrammatic representations of various field winding arrangements for a three-phase dynamoelectric machine;

FIG. 7 is a partial cutaway perspective view of a conduit box in accordance with one form of the present invention;

FIG. 14 is a side planar view of the connection block portion of FIG. 13 with internal features shown in phantom;

FIG. 15 is an elevation view of the plug member portion of the interconnection device of FIG. 8 showing internal elements in phantom;

FIG. 16 is an end view of the plug member portion of FIG. 15;

FIG. 17 is a cross-sectional view of the plug member portion of FIG. 15 taken along the lines 17—17;

FIG. 18 is a partial cross-sectional view of the conduit box of FIG. 7 mounted on a dynamoelectric machine and illustrating a method for assembly of the box and interconnection device in one form of the present invention;

FIG. 19 illustrates a power terminal assembly and demonstrates one form of connection of the power terminal, motor winding and termination for the interconnection device; and FIGS. 20–21 illustrate the power terminal of FIG. 19 in more detail including one method of forming the terminal.

DETAILED DESCRIPTION OF THE INVENTION

Figure 5A:
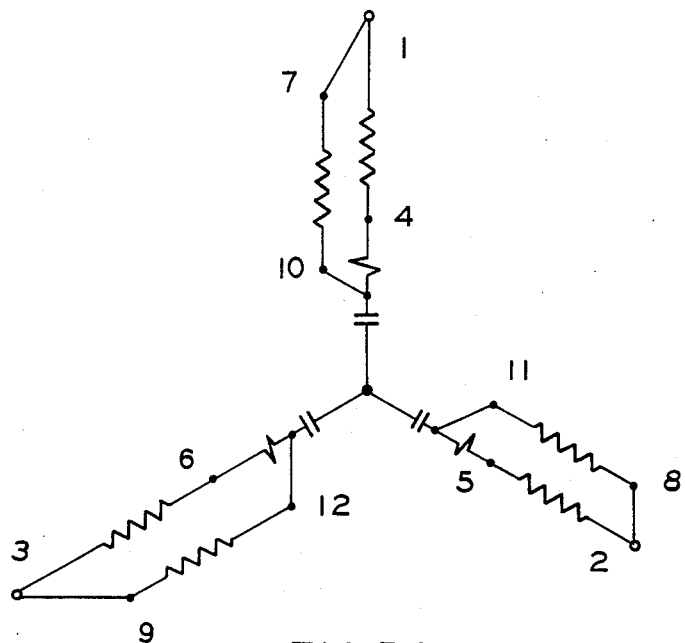

Referring now to the drawings in general and with reference first to FIGS. 1 and 2, there is shown a profile view of a motor 31 mounted on a pedestal 33 and having a double-ended shaft 35 extending therefrom. Attached to a housing of the motor 31 is a junction box or conduit box 37 into which motor leads 39 as well as power lines L1, L2 and L3 are led for appropriate connection. The conduit box and connection apparatus of FIGS. 1 and 2 are typical of prior art devices. By reference to FIG. 2 which is a cross-sectional view taken along the lines 2—2 of FIG. 1, a particular connection of the motor leads to the conduit box can be seen. Before describing the particularities of the motor connections, reference is also made to FIGS. 3 and 4 which illustrate two alternative phase winding connections of a three-phase motor which allows the motor to operate from, for example, 440 volts or 220 volts AC. In the higher voltage connection of FIG. 3, the power line terminals L1, L2 and L3 are connected to motor lead terminals 1, 2 and 3, respectively. Each of the windings of each phase are serially connected between the corresponding power lead and a common junction 13. For purposes of discussion, one of the windings in each phase has been labeled as 41 and the other windings in each phase are labeled as 43. The leads for each winding of each phase are labeled in a conventional manner indicating that there are actually twelve motor leads which must be connected for each possible configuration. In the connection diagram of FIG. 4, it can be seen that the windings 41 and 43 of each phase are electrically connected in parallel. While the connection shown in FIG. 4 indicates that there are two separate common connections 13A and 13B, it will be appreciated that these connections may be interconnected to form a single common terminal.

The apparatus located within the terminal box 37 provides one form of interconnection of the winding leads to achieve either the circuit connection of FIG. 3 or the circuit connection of FIG. 4 depending upon the desire of the motor user.

Referring back to FIG. 1, the power lines L1, L2 and L3 are connected to electrically conductive members 45, 47 and 49, respectively which are in turn connected to the stationary portion 51 of the connecting apparatus. The portion 51 comprises an insulating panel adapted for being fixedly mounted in the conduit box by means of the screws 53 as shown in FIG. 2. The conducting members 45, 47 and 49 are each secured in position on panel 51 by means of a corresponding stud 55 which receives a clamping screw on the backside of the panel 51 for connection thereto of one of the motor leads. The ends of the members 45, 47 and 49 adjacent the points at which they are secured by the studs are turned upwardly to form extending tangs 57 above the surface of the panel 51. There is also provided a second row of studs (not shown) arranged in alignment with the studs 55, with each of the studs of the second row also comprising a clamping screw in the back for connection to one of the motor leads while on the front side of panel 51 each of the studs of the second row has a member which is turned upwardly like portion 57 of the members 45, 47 and 49. A third row of studs is also provided in panel 51 and are likewise provided with clamping screws for clamping motor leads to the associated studs, each of the studs of the third row also including a turned up member connected on the front side of panel.

The above described arrangement of panel 51 and mounting studs is such that the power lines L1, L2 and L3 can be connected with the members 45, 47 and 49 with the nine motor leads previously identified being clamped under the screws associated with corresponding ones of the rows of studs. The motor leads are connected with the studs so that the outer ends of the portions 41 of the windings, as they are viewed in FIGS. 3 and 4, are clamped by the screws associated with the studs 55 of the first row. The outer ends of the inner portion 43 of the windings are clamped by the screws associated with the second row of studs and the inner ends of the outer portions 41 of the windings are clamped by the screws 53 on the last row of studs.

In order to interconnect the windings, there is provided an adjustable member 59 having a plurality of apertures 61 distributed such that the upturned portions 57 and the upturned portions of the other studs will extend into the apertures. The member 59 comprises a panel of electrically insulative material having mounting ears or lugs 63 with holes that are adapted for registering with, for example, the threaded holes 65 on panel 51. When member 59 is positioned such that the holes in lugs 63 register with holes in panel 51 aligned with screws 67, the member 59 occupies a position on panel 51 as is illustrated in FIG. 1. If the member 59 is adjusted so that the holes in lugs 63 register with holes 65, the member 59 will be seen to be shifted towards the left hand side of the figure so that different ones of the upturned portions of the first, second and third rows of studs will be interconnected through the apertures 61 within the member 59.

Secured to one side of the member 59, such as by rivets 69, are U-shaped contacting strips (not shown) having their ends turned up so as to extend into the apertures 61. The turned up ends of the contacting strips are resilient and when member 59 is disassembled from panel 51, the turned up portions flex and extend nearly across the apertures 61. When the member 59 is mounted on panel 51, however, the bent up portions will yield electrical contact with the upstanding members or tangs, such as tangs 57, of the rows of studs. Screws 67 are utilized for clamping the member 59 in position on panel 51.

When the member 59 is mounted on panel 51 in its left hand position, as the parts are viewed in FIG. 1, member 59 serves to interconnect the inner ends of the outer portions 41 of the motor windings and to interconnect power lines L1, L2 and L3 with the outer ends of the inner portion 43 of the windings whereby lower voltage operation of the motor is attained. However, when the member 59 is adjusted to its right hand position, as it is viewed in FIG. 1, only the inner contacting strips are effective and they serve to interconnect the outer ends of outer portions 41 of the windings with the outer ends of the inner portion whereby higher voltage operation of the motor can be obtained by interconnection as shown in FIG. 3. There are a number of disadvantages to the above recited motor coil interconnection apparatus as shown in FIGS. 1 and 2. For example, it is difficult to assemble the motor coil leads to the apparatus without having an extended amount of lead wire available for interconnection since all connections require screwdriver access. This in turn requires that excess space must be provided for storage of the excess lead wire. Still another disadvantage is that the apparatus of FIGS. 1 and 2 does not provide means for interconnecting motor coils in which current overload devices are incorporated in the motor. Note that only provision for nine lead interconnection is available. An example of an electrical schematic for a motor in which current overload devices are included is shown in FIG. 5. In that figure, the sensing devices are shown at 71, 73 and 75 and the contacts coupled to each of the devices are indicated at 77, 79 and 81. For motors in which it is desirable to include overload current protection, it will be appreciated that twelve lead interconnection is necessary.

Figure 6A:
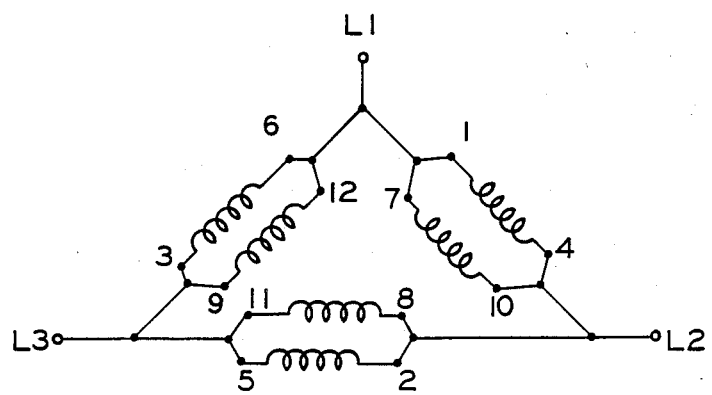

It is also desirable to be able to connect the motor coil winding in either a WYE configuration as shown in FIGS. 3, 4 and 5, 5A or in a delta configuration of types shown in FIG. 6, 6A. The terminal numbers for each of the lead wires for each coil section of the motor have been maintained the same as for FIGS. 3, 4 and 5 in order to illustrate the manner in which the respective lead wires are interconnected in order to form the configuration.

Turning now to FIG. 7, there is shown an illustrative embodiment of a novel conduit box for use with the present invention. The conduit box indicated at 83 is shown in a partial cutaway perspective view to include an opening 85 for admitting wiring from the motor into the box and a table 87 for mounting an interconnection device or coil interconnection apparatus in a manner hereinafter described. A plurality of mounting slots 89 are positioned in the bottom of the conduit box 83 for allowing the box to be attached to a motor housing such as by screws. It will of course be appreciated that the slots 89 could be replaced by apertures through the lower surface of the box or by extended external tabs outside of the box. The conduit box 83 also includes threaded screw receiving receptacles 91 at each corner thereof to allow attachment of a cover plate over the box. For purposes of simplicity of the description, the coil interconnection apparatus will be hereinafter referred to as a interconnection device or ICD since the primary function of interconnecting the coil lead wires in different configurations is generally to vary the voltage at which the motor is to be operated. While the mechanism may also incorporate a change from a WYE connection arrangement to a delta connection arrangement, within each of those arrangements, the apparatus further provides for reconnection of the motor coils in order to allow operation at different voltages. However, each plug device can only accommodate a voltage change. To effect a change from delta to WYE requires a different plug device. Furthermore, the winding arrangements for delta and WYE wound motors are different so that interconnection blocks are desirable. Each of these blocks and their associated plug devices are keyed to prevent improper connection. As can be seen, the table 87 extends slightly above the bottom surface of the conduit box 83 and has at least one end 93 which extends beyond the supporting legs 95 of the table. Preferably, the conduit box 83 is a cast aluminum box which can be molded in one piece to form a complete box. If the box were molded plastic, the base member 99 could be integral with the box.

Figure 8:
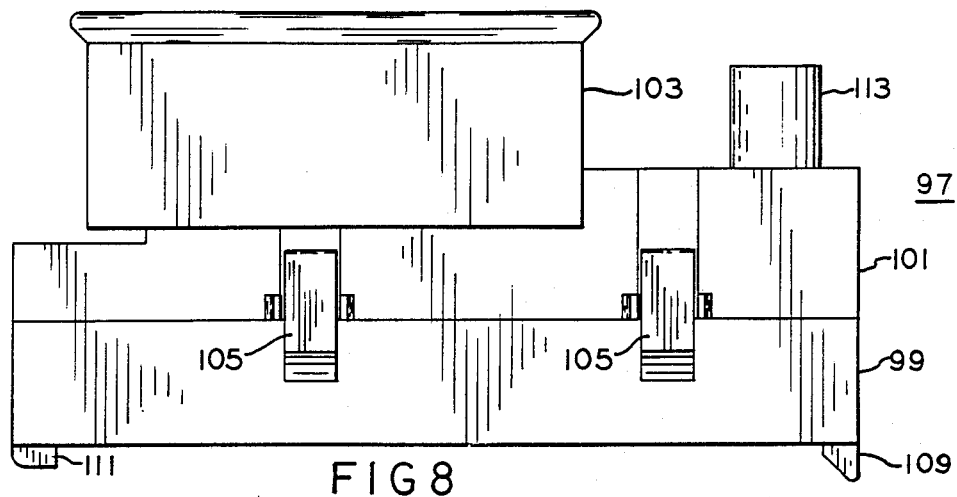
FIGS. 8–10 are side, end and top planar views, respectively, of an interconnection device in accordance with one embodiment of the present invention.
Figure 9:
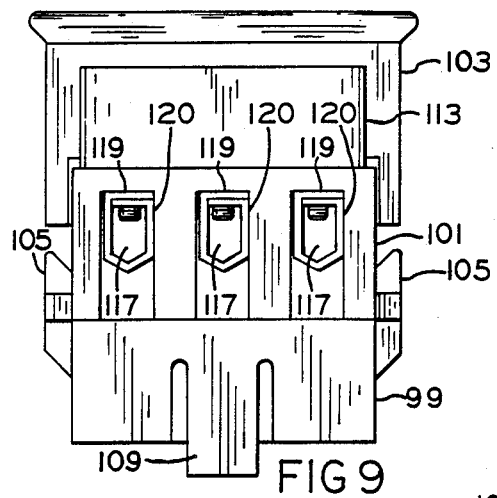
Figure 10:
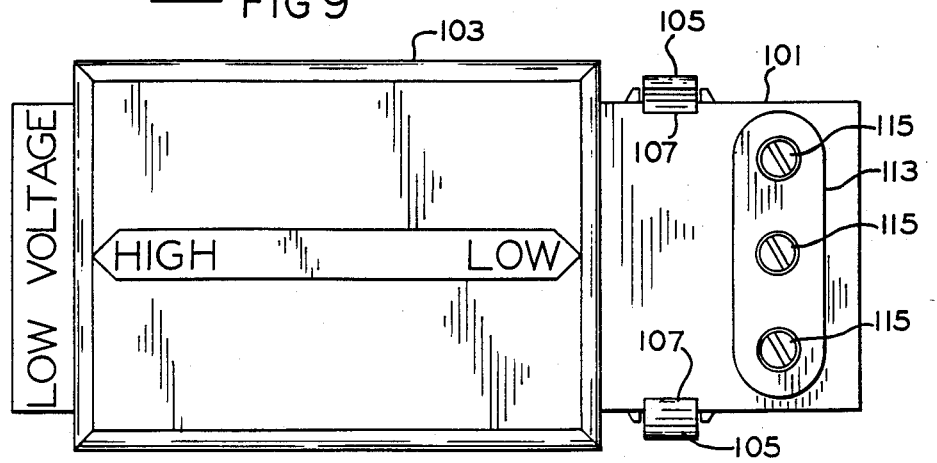

Referring generally to FIGS. 8, 9 and 10, there is shown an side view, an end view and a top view, respectively, of a interconnection device or ICD 97 constructed in accordance with one form of the present invention. The ICD 97 can be seen to comprise a base 99, a connection block 101 and a plug member 103. These three primary elements of the ICD 97 are preferably formed from molded plastic so as to provide electrical insulation and to incorporate integral fingers and tangs as will be hereinafter described. In partcular, the base 99 includes four upwardly extending flexible fingers 105 having inwardly directed portions 107 designed to engage upper surfaces of the connection block 101 so as to fasten the base to the connection block. The base 99 also includes a downwardly extending finger 109 on one end thereof and a lip 111 formed on an opposite end thereof. The finger 109 and lip 111 are utilized for attaching the base 99 to the table 87 in conduit box 83. Mounted on top of the connection block 101 is a screw housing 113 containing screws 115 for compression and electrical connection of power lines L1, L2 and L3 which are inserted into the slots 117 located in the connection block 101. Terminal means 119 are positioned in each of the slots 117 of connection block 101. As shown in FIG. 10, the plug 70 has printed labels on the top thereof for indicating how the plug is to be shifted for reinsertion to interconnect the motors for either a high or low voltage operation. When the plug is shifted to the right as shown in FIG. 10, the motor is configured for low voltage operations, as is indicated by the exposed "LOW VOLTAGE" label on the left end of the ICD 97. When the plug is shifted towards the left, the low voltage label is covered and a "HIGH VOLTAGE" label exposed adjacent the right of plug 103.

Figure 11:
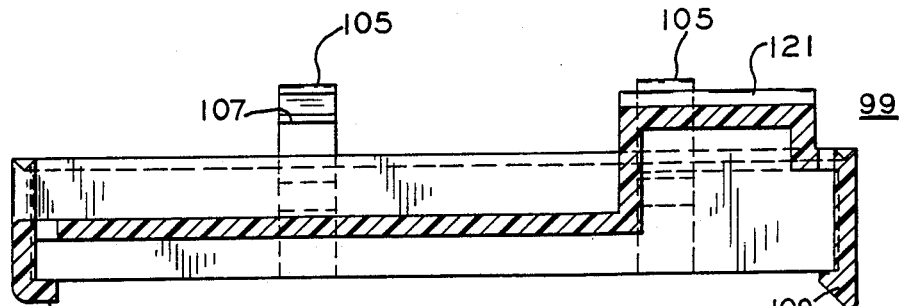
FIG. 11 is a cross-sectional view of a base portion of the interconnection device of FIG. 8.
Figure 12:
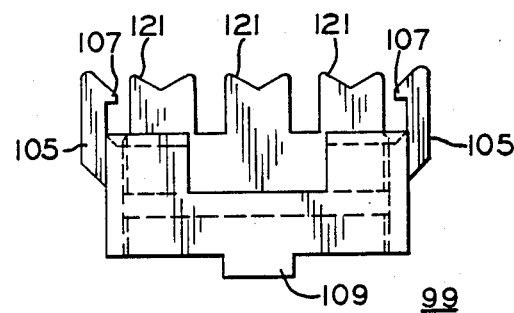
FIG. 12 is an end view of the base portion of FIG. 11.

FIGS. 11 and 12 illustrate the construction of the base member 99 in more detail. In particular, FIG. 11 is a cross-sectional view of the base 99 showing the details of the depending finger member 109 and lip 111. As will be appreciated, the base 99 can be attached to the table 87 by canting the base at an angle so that the lip 111 engages the lower surface of the lip 93 of table 87. The base 99 is then rotated clockwise about the engagement point on lip 93 so that the finger member 109 is brought down so as to latch onto the opposite end of the table 87 to hold the base in position on the table. One of the unique advantages of this arrangement is that when the assembled ICD 97 is positioned over the aperture 85 it is only necessary to rotate the ICD 97 clockwise in order to firmly seat and attach it to the conduit box 83. This advantageously assures that the lead wires from the coil sections of the motor need only be sufficiently long to extend into the conduit box since the ICD 97 can be positioned on its end while the lead wires are connected to ICD 97. This is especially important where the lead wires are extensions of the coil magnet wire rather than stranded wire connected to the coil ends. FIG. 12 is an end view of the base 99 and illustrates three upwardly directed flange which are utilized to press the terminal members 119 into the apertures 117 and to thereby secure the members 119 within those apertures. FIG. 12 also shows a clearer view of the side latching members 105 for attaching base 99 to connection block 101.

Figure 13:
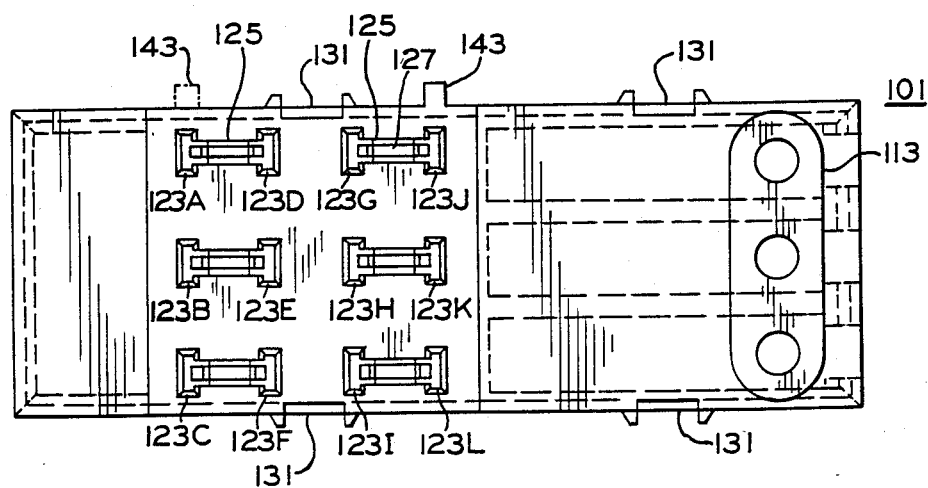
FIG. 13 is a top planar view of a connection block portion of the interconnection device of FIG. 8.

FIGS. 13 and 14 are top and side views, respectively, of the connection block 101. FIG. 13 illustrates twelve apertures 123A through 123L, each of which is adapted to receive a terminal connected to a corresponding one of the coil lead wires from the motor 31. As can be seen in FIG. 13, the apertures are arranged in pairs with a slot 125 connecting each pair of apertures. The slots 125 include retention pins 127 which have outwardly extending members 129 which extend into the apertures 123. The members 129 are plastic members that are biased to flex towards a corresponding one of the apertures 123. As can be seen in FIG. 14, each of the pins 127 incorporates a pair of the extending members 129. As will become apparent, each of the apertures 123 is sized to admit an electrically conductive connector having a receiving end for receiving a depending electrical connector from the conductor plug 103 for interconnecting selected ones of the terminal means positioned within the apertures 123. For structural integrity and for providing adequate length for receiving the terminations of the coil lead wires, that portion of the connection block 101 in which the apertures 123 are positioned will be seen to be thicker than the remainder of the block 101.

As viewed in FIGS. 13 and 14, the power leads L1, L2 and L3 are connected to the connection block 101 at the right hand end by means of the termination means 119. The termination means 119 includes a portion which can be crimped to connect to the coil lead wires (labeled 1, 2 and 3 in FIGS. 3-6) which are always directly connected to the incoming power lines L1, L2 and L3. In addition, it is desirable to crimp an additional wire to the connectors 119, which additional wire terminates in an electrical terminal positioned in one of the apertures 123 within the connection block 101.

It will also be noted that the connection block 101 includes slotted areas 131 which serve as guides and restraining elements for the upwardly directed fingers 105 from the base member 99. These slots 131 assure the accurate positioning of the connection block 101 onto the base member 99.

Turning now to FIGS. 15, 16 and 17, there is shown respectively, a top view, an end view and a cross-sectional view taken along the line 17—17 of the plug member 103. The plug member 103 is preferably a molded plastic member in which a plurality of electrically conductive terminals 133 are molded. As viewed in FIGS. 15 and 17, the electrically conductive terminals 133 can be seen to be U-shaped terminals serving to interconnect adjacent pairs of terminations within the apertures 123 of the connection block 101. In one embodiment, the electrical conductive terminals 133 of two rows of terminals indicated generally at 135 may be electrically interconnected by a common bus 137. Considering the electrical diagrams of FIGS. 3 and 4, if the plug member 103 is inserted so that the terminals 133 enter each of the apertures 123A-123L, the electrical connection of FIG. 4 will be implemented except that common terminals 13A and 13B will be connected. Separation of these common terminals can be achieved by eliminating the common bus 137 or by internal connection within the motor and use of only nine leads. If the plug member 103 is shifted to the left as viewed in FIG. 13, the electrical connection of FIG. 3 will be implemented.

Other forms of electrical interconnection can be implemented by changing the terminal structure within plug member 103. It will be noted that plug member 103 includes pairs of several internal ribs 139 extending from top to bottom. These ribs 139 define slots 141 which cooperate with an external protrusion 143 on connection member 101 to guide plug member 103 during insertion of member 103 onto member 101. A different protrusion 143 and pairs of ribs 139, indicated at in phantom, would be used for a different type motor, e.g., one with overload protection. Furthermore, the ribs prevent interchange of one plug with another, i.e., a plug for a one-delta, two-delta motor cannot be interchanged with a plug for a one-wye, two-wye motor. Such guiding is desirable to assure proper insertion of the plug member and to prevent bending of the terminals 133 if the plug member is misaligned.

Turning to FIG. 18, there is shown a cross-sectional view of the inventive conduit box assembly and ICD positioned for final assembly. The lead wires 145 from the motor windings exit the motor housing and enter directly into conduit box 83 via aperture 85. The wires 145 enter the ICD 97 through its lower end as viewed in FIG. 18 and terminate in terminals inserted into apertures 123A-123L. The three lead wires from winding ends 1, 2 and 3 are first connected to terminal member 119 (see FIG. 19) and a short wire 147 then leads from member 119 to a termination 149 adapted to be inserted in apertures 123J-123L.

As will be appreciated from an examination of FIG. 19, the lead wires 145 are terminated in termination devices such as that illustrated at 149. Such devices are either crimped, soldered, or welded to the lead wires or coil ends and then inserted into corresponding ones of the apertures 123. During the assembly process, the base member 99 and plug member 103 are disconnected from the connection block 101 thus enabling the terminated lead wires to easily coupled to the block 101. Only sufficient wire length to reach from motor 31 to just above the table 87 is required for such assembly. With the lead wires coupled to block 101, the base 99 is latched to block 101 by means of latching fingers. The assembled base and block is then rotated clockwise, catching flange 11 on lip 93 of table 87, until the base 99 sits flat on table 87 and latching finger 109 snaps onto table 87 at the end opposite lip 93. A plug member 103 can then be inserted onto block 101 to select an appropriate interconnection of the motor windings. A flat cover (not shown) may be attached to the conduit box 83 using screws into the threaded apertures 91. For integrity of the assembly, the height of the conduit box is selected such that a flat cover will contact the top surface of plug member 103 and prevent undesirable separation of the assembled ICD.

One of the unique features of the present invention is the power line connection terminal 119 which is shown in more detail in FIGS. 20 and 21. The terminal 119 may be stamped or punched from electrically conductive sheet material into the form shown in FIG. 20. In this form, there is a rectangular portion 151 and a tabbed portion 153 extending at a right angle from one end of the portion 151. The tabbed portion 153 includes multiple tabs 155 which can be bent as shown in FIG. 21 for crimping wires to the terminal 119.

The rectangular portion 151 is embossed at lines 157A-157E to facilitate forming the portion 151 into the configuration shown in FIG. 21. As the portion 151 is successively bent at the lines 157A-157E, the opening 117 is formed. The hole 159A and 159B align to create an aperture 161 for receiving clamping screw 115. A tab or flange 163 is formed on one end of portion 151 and dimensioned to fit through slot 165 adjacent another end of portion 151. Note that the tab 163 extends outwardly of the formed terminal opening 117. Also, the length of the section of portion 151 between tab 163 and line 157E is less than the length of the section between line 157A and end 167. This length difference causes end 167 to extend outwardly of the side of the formed terminal 119. The purpose of the two extending sides, i.e., tab 163 and end 167, is to provide edges which can be used to retain terminal 119 within the slots 120 in connection with block 101 during assembly prior to attachment to base 99. The extending sides make terminal 119 slightly wide than slots 120 so that the sides "bite" into the plastic material of block 101. If desired, the tab 163 and end 167 may be formed with tapered edges to ease insertion but oppose removal.

Another advantage of the construction of terminal 119 is the added stiffness about the formed opening 117 achieved by passing the tab 163 through the slot 165. Support of the section of the terminal portion 151 between line 157E and tab 163 in this manner facilitates threading of the opening 161 and better supports the compression screw 115.

While only certain preferred features of the invention have been shown by way of illustration, many modifications and changes will occur to those skilled in the art. It is, therefore, to be understood that the present claims are intended to cover all such modifications and changes which fall within the true spirit of the invention.

I claim:

1. A dynamoelectric machine adapted for energization from a power source comprising:
   a housing including a stationary assembly having a plurality of winding means for excitation upon the energization of the dynamoelectric machine and disposed in a predetermined relationship with each other, each winding means having a plurality of lead wires connectable to each other and to the power source in at least two different configurations;
   a terminal box assembly mounted to said housing exteriorly thereof and having a mounting table disposed within the terminal box assembly;
   a plurality of termination means for connection to said lead wires respectively;
   a terminal block having a plurality of predeterminately oriented aperture means for respectively receiving said termination means;
   a plug device for coupling with said terminal block in at least two different orientations to effect interconnection of the winding means in the at least two different configurations;
   a base member releasably connected to said terminal block and seated in engagement on said mounting table within said terminal box assembly, said base member for releasably maintaining said base member against displacement from the seating engagement thereof with said mounting table; and
   means associated with said terminal block for connecting at least some of the said termination means to the power source thereby to effect energization of the dynamoelectric machine and the excitation of said winding means in a preselected one of the two different configurations.

2. The assembly of claim 1 wherein said means for connecting the electrical power source comprises a plurality of electrical terminals each having a first end with integral bendable tabs for crimping onto preselected ones of said lead wires and a second end formed in a closed loop for receiving a conductor from the electrical power source, each said closed end including a threaded aperture and a second screw threaded therein, said screw being positioned for clamping said conductor within said closed loop.

3. The assembly of claim 2 wherein said second end of said electrical terminals comprises a metallic strip having a first end integral with said second end of said terminal and extending from said second end perpendicular to an axis of said closed loop, a second end of said strip terminating in a reduced width tang, an aperture being formed in said strip adjacent said first end thereof, said strip being repetitively bent to form said closed loop such that said tang extends through said aperture.

4. The assembly of claim 3 wherein said second end of said electrical terminal overlaps said second end of said strip, said threaded aperture extending into said closed loop through said overlapping second ends.

5. The assembly of claim 4 wherein said second end of said electrical terminal extends beyond a perimeter of said closed loop in a direction opposite to the direction of said tang, said terminal block including a plurality of slots with each slot being adapted to receive one of said electrical terminals, said tang and said extended second end of said terminal frictionally engaging sides of said slot for inhibiting removal of said terminals.

6. A terminal box assembly for use in a dynamoelectric machine adapted to be energized from an electrical power source, the dynamoelectric machine including a plurality of windings disposed in a predetermined relationship with each other, each winding terminating in a plurality of lead wires, the lead wires being connectable to each other and to the electrical power source in at least two different configurations, the terminal box assembly comprising:

a plurality of termination means for connection to the lead wires, respectively;

a terminal block having a plurality of predeterminately oriented aperture means, said aperture means including a plurality of means for engaging said termination means and preventing inadvertent removal thereof from the terminal block member, respectively;

a plug device for coupling with said terminal block in at least two different orientations, said plug device including a plurality of electrically conductive elements disposed therein, each element terminating in a plug means for electrically mating with a selected one of said termination means in said terminal block when said plug device is coupled to said terminal block, and said elements interconnecting predetermined ones of said plug means to effect connection of the windings to each other in each of the two different configurations when said plug device is coupled to said terminal block in a corresponding one of the two different orientations;

a base member releasably connected to said terminal block and latching means integral with said base member for releasably coupling said connected terminal block and base member to the dynamoelectric machine; and means associated with said terminal block for connecting the electrical power source to the at least some termination means for energizing the windings of the dynamoelectric machine in a preselected one of the two different configurations.

* * * * *